US006213279B1

(12) United States Patent
Killingbeck et al.

(10) Patent No.: US 6,213,279 B1
(45) Date of Patent: Apr. 10, 2001

(54) MACHINE FOR SELECTIVELY POSITIONING A WORK MEMBER AT A WORK STATION

(75) Inventors: Bruce Killingbeck, Leroy; John M. Porter, Illewild, both of MI (US)

(73) Assignee: Pilot Industries, Inc., Dexter, MI (US)

( * ) Notice: Subject to any disclaimer, the term of this patent is extended or adjusted under 35 U.S.C. 154(b) by 0 days.

(21) Appl. No.: 09/354,278

(22) Filed: Jul. 15, 1999

(51) Int. Cl.$^7$ .............................. B65G 13/12; B65G 47/80
(52) U.S. Cl. .................................. 198/346.1; 198/369.1; 198/369.4
(58) Field of Search .............................. 198/345.1, 346.1, 198/369.1, 369.4; 425/403.1

(56) References Cited

U.S. PATENT DOCUMENTS

| 4,326,624 | * | 4/1982 | Ewertowski et al. | 198/346.1 |
| 4,589,467 | * | 5/1986 | Hunter | 198/346.1 |
| 5,062,190 | * | 11/1991 | Kitamura | 198/346.1 |
| 5,992,608 | * | 11/1999 | Ahn | 198/346.1 |

* cited by examiner

Primary Examiner—Christopher P. Ellis
Assistant Examiner—Mark A. Deuble
(74) Attorney, Agent, or Firm—Gifford, Krass, Groh, Sprinkle, Anderson & Citkowski, P.C.

(57) ABSTRACT

A machine is disclosed having a frame with a work station adapted to receive a work member, such as a die set. The apparatus includes a turntable pivotally mounted to the frame at a position spaced from the work station. A first and second linear conveyor section are mounted to the turntable and each section has a first end and a second end. The second ends of the conveyor sections are adjacent each other and the conveyor sections extend outwardly on the turntable in a direction substantially perpendicular to each other. An actuator selectively pivots the turntable between a first position in which the first end of the first conveyor section is aligned with the work station, and a second position in which the first end of the second conveyor section is aligned with the work station. Each conveyor section supports one work member while a pusher selectively engages one of the work members on the conveyor section to move the engaged work member between an operable position in which the engaged work member is positioned at the work station, and a standby position in which the engaged work member is positioned at the second end of its respective conveyor section.

14 Claims, 4 Drawing Sheets

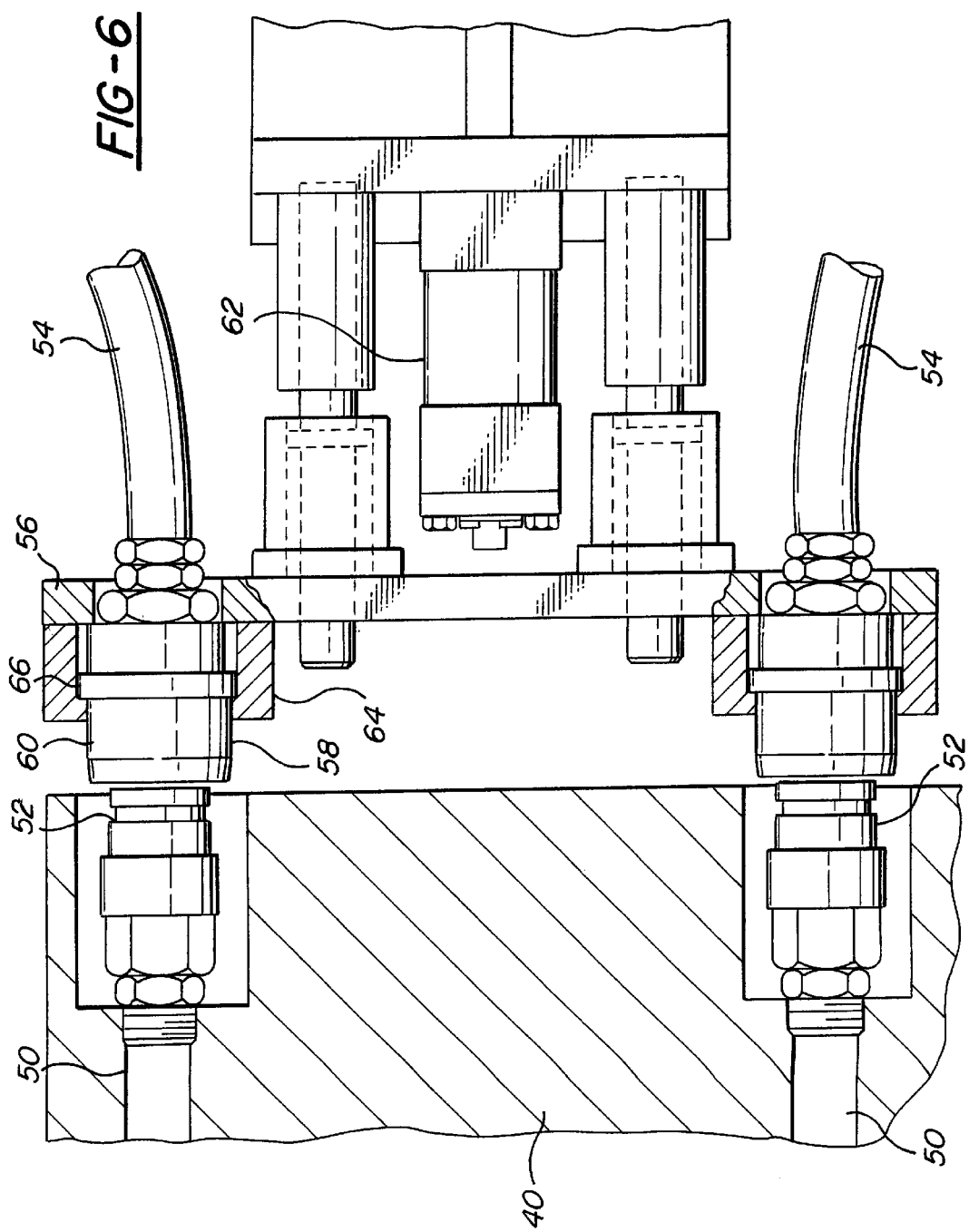

MACHINE FOR SELECTIVELY POSITIONING A WORK MEMBER AT A WORK STATION

BACKGROUND OF THE INVENTION

I. Field of the Invention

The present invention relates generally to machines and, more particularly, to a machine to selectively position work members, such as a die set, at a work station in the machine.

II. Description of the Prior Art

There are many different types of machines in which a work member is positioned at a work station. For example, if the machine is a stamping press, the work member comprises a die set which is positioned at the work station. The dies in the die set are movable between an open position, in which the dies are spaced apart from each other, and a closed position, in which the dies press against each other to form the desired parts therebetween.

In many stamping presses, the stamping press is used to form a single part. In this case, the dies are positioned at a work station in the press and secured to the press in any conventional fashion. Actuation of the press then causes the stamping dies to move between their open and closed positions during the stamping operation.

While these previously known stamping presses have proven satisfactory where only a single type of part is produced by the press, in many different situations, it is necessary to change the dies at the work station in order to stamp different types of parts. Furthermore, in a production facility, the cycle time for the stamped parts forms a critical part of the overall manufacturing operation. Consequently, where it is necessary to change the dies in the press in order to stamp different types of parts, it is desirable that the time necessary to change the dies at the work station be as short as possible.

There have been previously known stamping presses in which one die set is positioned on one side of the press work station while, similarly, a second die set is positioned on the opposite side of the press work station. Each pair of dies in each die set forms a single type of part during operation of the press.

In order to selectively move one of the die pairs into the work station, it has been the previous practice to provide a conveyor section on each side of the press work station wherein each conveyor section supports one die set. A pusher is then associated with each die set in order to selectively move its associated die set between a standby position in which the die set is positioned away from the work station, and an operable position in which the die set is positioned at the work station. Conventional clamping means are then used to secure the die set at the work station to move the dies at the work station between an open and closed position.

While these previously known stamping presses with two die sets have proven successful in operation, in some situations three or even four different die sets are required to be used and rapidly changed in a single stamping press. The previously known presses have been unable to accommodate more than two die sets.

SUMMARY OF THE PRESENT INVENTION

The present invention provides an apparatus for use with a machine, such as a stamping press, molding machine or the like, having at least two and up to four different work members, e.g. four different die sets.

In brief, the apparatus of the present invention comprises a frame which defines a work station and at least two separate work members, such as die sets, molds or the like.

A turntable is pivotally mounted to the frame at a position spaced from the work station. A first and second linear conveyor section are mounted to the turntable and each conveyor section has a first and second end. The second ends of the conveyor sections are adjacent each other on the turntable and the conveyor sections extend in a direction generally perpendicular to each other.

An actuator is provided for selectively pivoting the turntable between a first position in which the first end of the first conveyor section is aligned with the work station, and a second position in which the first end of the second conveyor section is aligned with the work station. Furthermore, each conveyor section supports one work member.

A pusher, such as a hydraulic actuator, selectively engages the work member on its respective conveyor section to move the work member between a standby position in which the work member is laterally spaced from the work station, and an operable position, in which the work member is positioned at the work station. Consequently, with the first conveyor section aligned with the work station, the pusher assembly selectively moves the work member on the first conveyor section between its operable and standby positions. With the work member in the standby position, actuation of the turntable to pivot the turntable to its second position aligns the second conveyor section with the work station. Thereafter, the work member supported on the conveyor section is selectively moved by the pusher between its standby and operable position.

In the preferred embodiment of the invention, the turntable supports two conveyor sections. However, three or even four conveyor sections can be supported by the turntable thus allowing a single turntable to support up to four work members, any one of which can be selectively moved to the work station. Furthermore, with one turntable positioned on each side of the work station, up to eight different work members may be selectively positioned at the work station.

With the work member positioned at the work station, conventional clamping means are employed to clamp the work members to the machine to enable the work members to be employed in their conventional fashion at the work station.

In the case of a stamping press, the work members comprise a die set having two dies. In the case that the machine is a molding machine, the work member comprises a pair of mold halves.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 6 is a fragmentary view illustrating one portion of the preferred embodiment of the present invention.

DETAILED DESCRIPTION OF A PREFERRED EMBODIMENT OF THE PRESENT INVENTION

Figure 1:
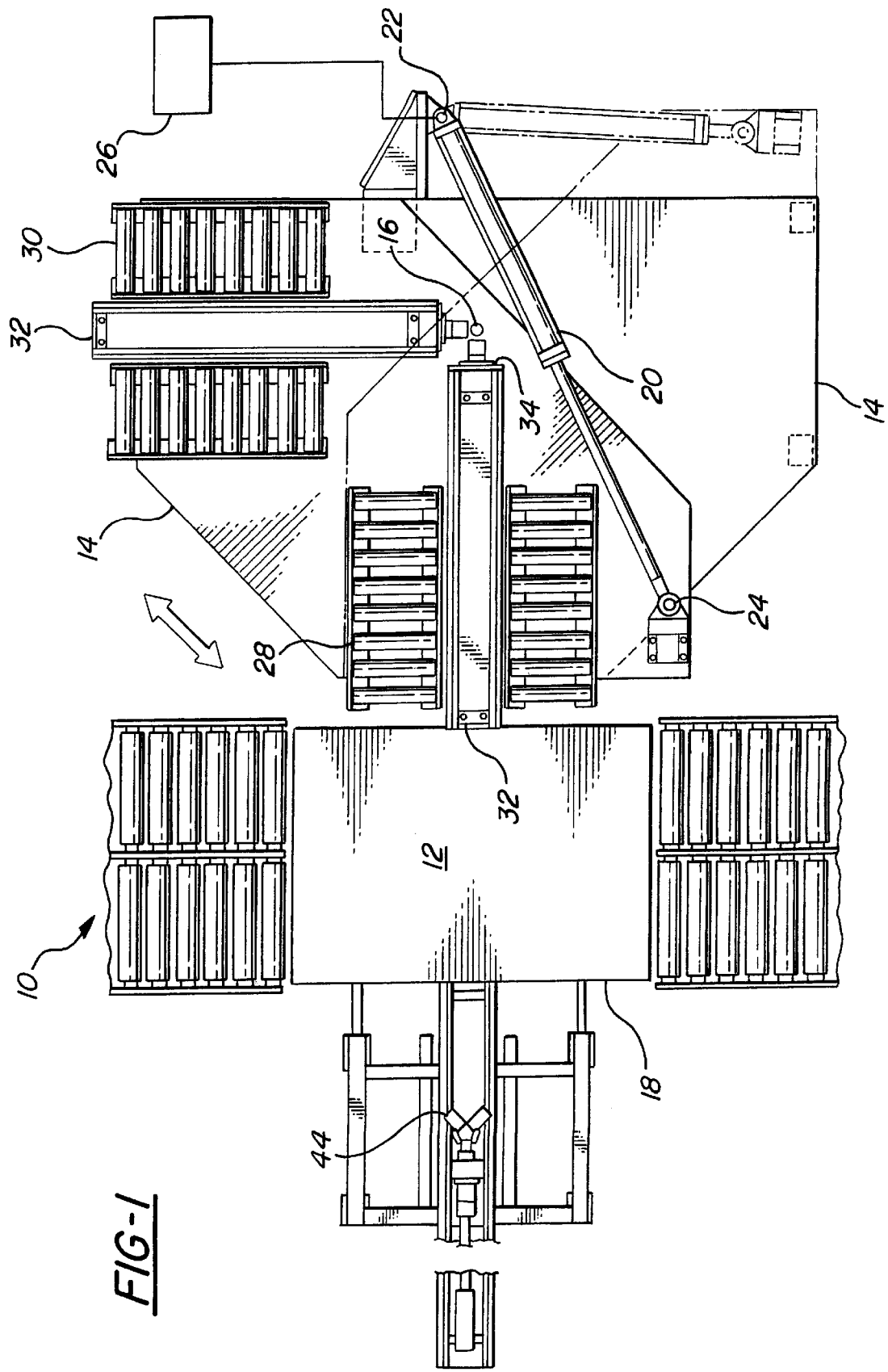
FIG. 1 is a top plan view illustrating a preferred embodiment of the present invention.
Figure 5:
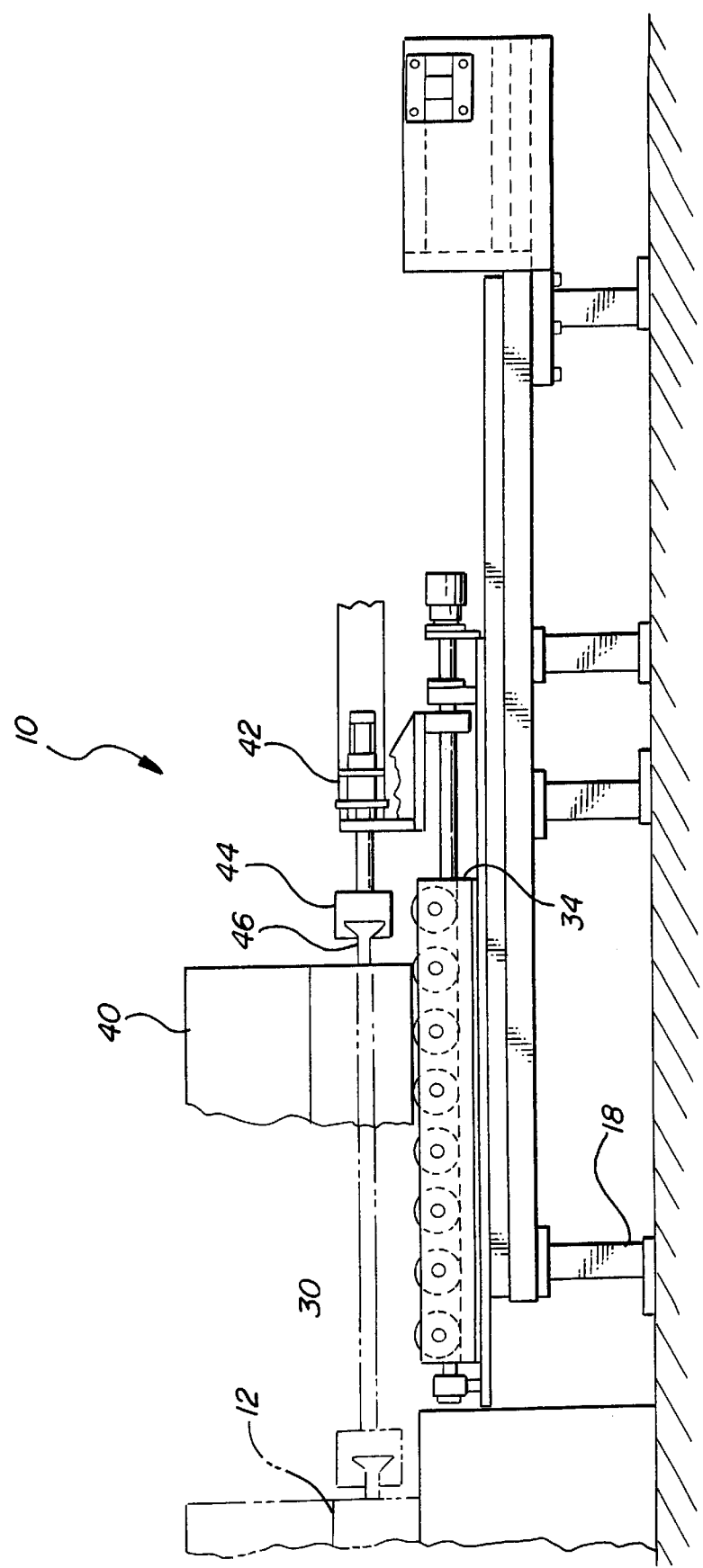
FIG. 5 is a side view illustrating the preferred embodiment of the present invention.

With reference first to FIGS. 1 and 5, a preferred embodiment of the present invention is there shown as a machine 10 having a work station 12. The machine 10 can, for example, comprise a stamping press in which a die set is positioned at the work station 12. The die set comprises two dies which are secured at the work station 12 and movable by the machine 10 between a spaced apart and closed position.

Alternatively, the machine 10 can comprise a mold in which a pair of mold halves are positioned at the work station 12 and movable between an open and a closed position. The machine 10 can comprise any type of molding machine, such as an injection molding machine, pressure molding machine and the like.

Still referring to FIGS. 1 and 5, the machine 10 of the present invention comprises a turntable 14 which is generally planar and pivotable about a generally vertical axis 16 between the position shown in solid line and phantom line in FIG. 1. The axis 16, furthermore, is fixed with respect to a machine frame 18.

In order to pivot the turntable 14, a piston and cylinder actuator is provided where a free end 22 of the piston or cylinder of the actuator 20 is secured to the machine frame 18 while the other free end 24 of the piston or cylinder of the actuator 20 is pivotally secured to the turntable 14. Conventional control means 26 are then used to selectively actuate the piston and cylinder actuator 20 between its extended and retracted positions thus pivoting the turntable 14 between a first and second pivotal position. Furthermore, although the actuator 20 is preferably used to pivot the turntable 14 between its first and second position, alternatively, any conventional means may be used to pivot the turntable 14.

A pair of linear roller conveyor sections 28 and 30 are supported on an upper surface of the turntable 14. Each turntable 28 and 30 includes a first end 32 and a second end 34. The second ends 34 of the conveyor sections 28 and 30 are adjacent each other while the conveyor sections 28 and 30 extend generally perpendicular with respect to each other.

With reference particularly to FIG. 1, the piston and cylinder arrangement 20 is movable between an extended position, illustrated in solid line in FIG. 1, and a retracted position, illustrated in phantom line in FIG. 1. In its extended position, the turntable 14 is moved to its first pivotal position in which the first end 32 of the first conveyor section 28 is aligned with the work station 12. Conversely, with the actuator in a retracted position and the turntable 14 in its second pivotal position, the first end 32 of the second conveyor section 30 is aligned with the work station 12.

With reference now particularly to FIG. 5, a work member 40, such as a die set or pair of mold halves, is supported on each conveyor section 28 or 30. Consequently, one work member 40 is supported by the conveyor section 28 while, similarly, a second work member 40 is supported by the second conveyor section 30. Typically, the work members 40 supported by the two conveyor sections 28 and 30 form different types of parts.

Still referring to FIG. 5, a pusher 42 having a clamp assembly 44 is associated with the turntable 14. Preferably, one pusher assembly 42 and clamp assembly 44 is associated with each conveyor section 28 and 30 although, alternatively, a single pusher 42 and clamp assembly 44 may accommodate both conveyor sections 28 and 30.

The clamp assembly 44 selectively clampingly engages a clamp receptor 46 mounted to the work member 40. With the clamp assembly 44 clampingly engaging the receptacle 46, the pusher 42, which preferably comprises a hydraulic or pneumatic actuator, selectively moves the work member 40 along its associated conveyor section 28 or 30 between an operable position, in which the work member 40 is positioned at the work station 12, and a standby position, in which the work member 40 is positioned adjacent the second end 34 of its associated conveyor section 28 or 30. Furthermore, as is clear from FIG. 5, as the work member 40 is moved by the pusher 42 between its operable and standby positions, the conveyor section 28 or 30 rollably supports the work member 40 during its transverse movement.

Figure 2:
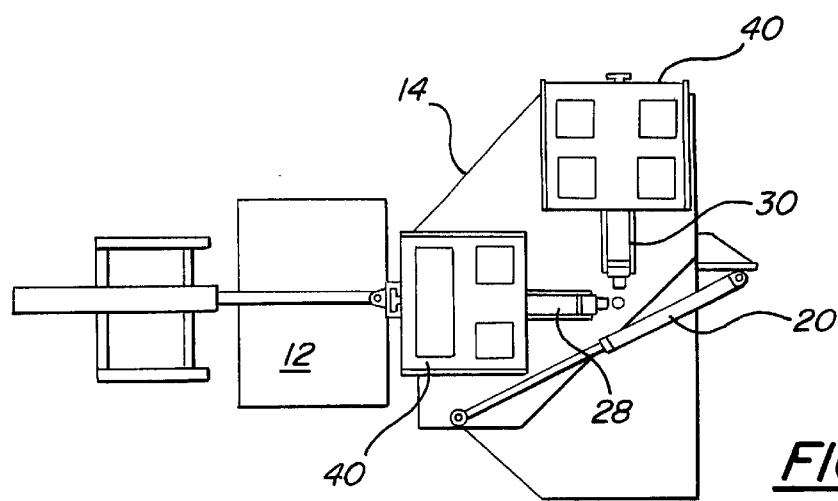
FIG. 2–FIG. 4 are diagrammatic top views illustrating the operation of the preferred embodiment of the present invention.
Figure 3:
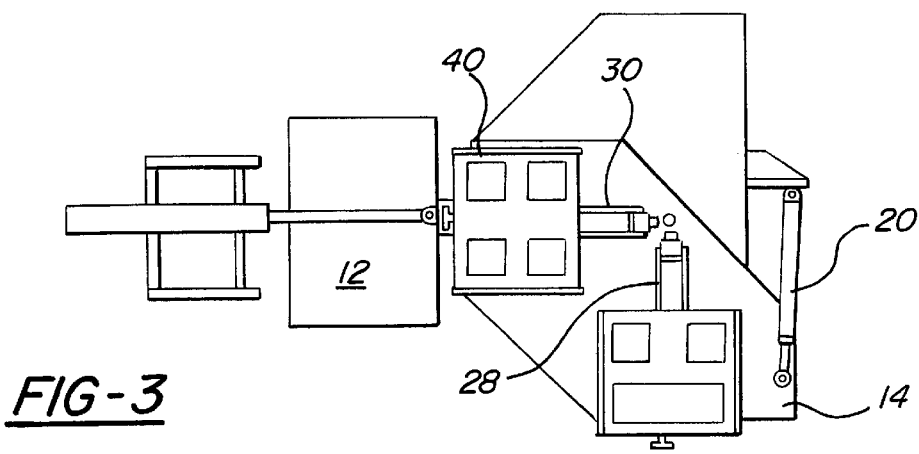
Figure 4:
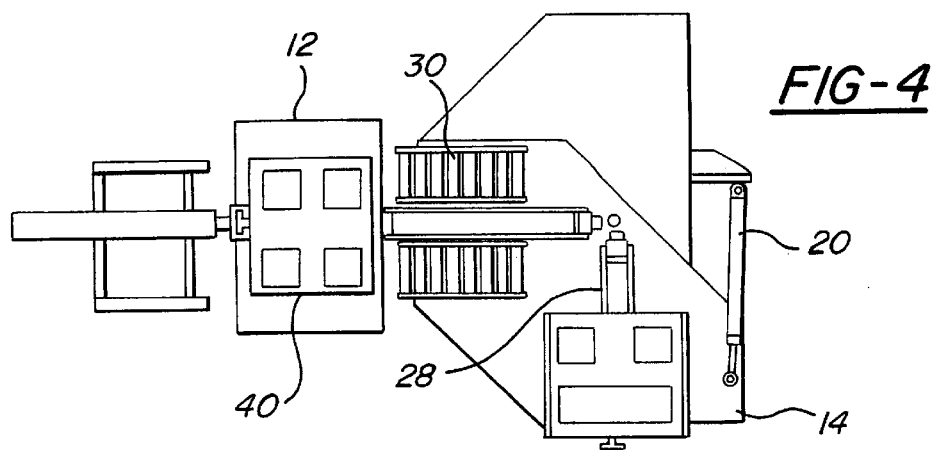

With reference now to FIGS. 2–4, the operation of the machine of the present invention will now be described. In FIG. 2, the turntable 14 is positioned at its first pivotal position in which the actuator 20 is in its extended position thus aligning the first conveyor 28 with the work station 12. At this time, each conveyor section 28 and 30 supports its own work member 40, such as a die set or pair of mold halves.

Assuming that it is desired to position the work member 40 supported by the second conveyor section 30 at the work station 12, the actuator 20 is moved to its retracted position as shown in FIG. 3. In doing so, the turntable 14 pivots to its second rotational position thus aligning the conveyor section 30 with its associated work member 40 with the work station 12. Actuation of the pusher 42 (FIG. 5) then moves the work member 40 longitudinally along the conveyor section 30 and into the work station 12 as shown in FIG. 4. The clamping assembly 44 releases the work member 40 after positioning the work member 40 at the work station 12 and conventional clamps at the work station 12 secure the halves of the work member to the machine to form the manufactured parts in the desired fashion.

With reference now to FIG. 6, in some situations, the work member 40 includes one or more fluid lines 50, each having a fluid fitting 52. These fluid fittings 52, furthermore, must be fluidly connected with external fluid lines 54 once the work member 40 is properly positioned at the work station 12.

In order to fluidly connect the fluid lines 54 to the fittings 52, the device of the present invention preferably comprises a bracket 56 which supports one or more quick connect couplings 58 which are aligned with the fluid fittings 52. Each quick connect coupling 58, furthermore, includes an outer sleeve 60 which, when moved to its retracted position, allows the quick connect coupling 58 to be disengaged from its associated fluid fitting 52. Furthermore, the quick connect coupling 58 is preferably a "push on" quick connect coupling in which the fluid connection between the coupling 58 and fitting 52 is achieved by simply pushing the coupling 58 over the fitting 52.

Once the work member 40 is positioned at the work station, a bracket actuator 62 selectively moves the bracket 56 with its attached quick connect couplings 58 between a disconnect position, illustrated in FIG. 6, and a connect position, in which the bracket actuator 62 forces the bracket 56 with its attached couplings 58 over their associated fluid fittings 52 thus establishing the fluid connection between the couplings 58 and fittings 52.

The bracket 56, furthermore, includes a grabber 64 which engages a rib 66 on the sleeve 58 closest to the fluid fitting 52. Thus, upon retraction of the bracket 56 away from the work member 40 by the bracket actuator 62, the grabbers 64 retract the sleeve 60 away from the work member 40 thus fluidly disconnecting the couplings 58 from their associated fittings 52.

It will be understood, however, that the provision of the fluid couplings shown in FIG. 6 is entirely optional. In many cases, for example when the work member is a die set, the work member may not include any fluid fittings.

Although the present invention has been described as a single turntable supporting two work members, it will be understood that the turntable can support three or even four conveyor sections, each supporting a different work member. Furthermore, since a turntable may be provided on each side of the work station 12, up to eight different work members can be selectively positioned at the work station.

From the foregoing, it can be seen that the present invention provides a simple and yet totally effective indexing table for selectively positioning different types of work members, such as die sets or molding halves, at a work station in a machine during a relatively short cycle time. Having described my invention, however, many modifications thereto will become apparent to those skilled in the art to which it pertains without deviation from the spirit of the invention as defined by the scope of the appended claims.

I claim:

1. An apparatus comprising:
   a frame, said frame having a work station,
   at least two separate work members,
   a turntable pivotally mounted to said frame at a position spaced from said work station,
   a first and second linear conveyor sections mounted to said turntable, each section having a first end and a second end, said conveyor sections extending in directions substantially perpendicular to each other, said second ends of said conveyor sections being adjacent each other, each conveyor section adapted to support one of said separate work members,
   an actuator for selectively pivoting said turntable between a first position in which said first end of said first conveyor section is aligned with said work station and a second position in which said first end of said second conveyor section is aligned with said work station,
   a pusher adapted to selectively engage one of said work members on said conveyor sections and move the engaged work member between an operable position in which said engaged work member is positioned at said work station and a standby position in which said engaged work member is positioned at said second end of its respective conveyor section, and
   a second pusher, one of said pushers being associated with each of said conveyor sections.

2. The invention as defined in claim 1 wherein each said pusher comprises a hydraulic actuator.

3. The invention as defined in claim 2 and comprising means associated with said pusher for selectively clampingly engaging said work member.

4. The invention as defined in claim 1 wherein each conveyor section comprises a roller conveyor section.

5. The invention as defined in claim 1 wherein each work member comprises at least one fluid fitting and comprising means for selectively connecting and disconnecting a fluid line to said fluid fitting when said work member is positioned at said work station.

6. The invention as defined in claim 5 wherein said fluid line includes a coupling having a sleeve movable between an extended and a retracted position, wherein in said retracted position said coupling is disconnectable from said fluid fitting, and means for selectively moving said sleeve to said retracted position.

7. The invention as defined in claim 6 wherein said means for selectively moving said sleeve comprises a bracket, a grabber mounted to said bracket and positioned around said sleeve, and a plate actuator for moving said bracket.

8. The invention as defined in claim 1 wherein said actuator comprises a piston and cylinder, one end of said piston and cylinder being attached to said frame and the other end of said piston and cylinder being attached to said turntable.

9. The invention as defined in claim 1 wherein said turntable is pivotally mounted to said frame about a substantially vertical axis.

10. An apparatus comprising:
    a frame, said frame having a work station,
    at least two separate work members,
    a turntable pivotally mounted to said frame at a position spaced from said work station,
    a first and second linear conveyor sections mounted to said turntable, each section having a first end and a second end, said conveyor sections extending in directions substantially perpendicular to each other, said second ends of said conveyor sections being adjacent each other, each conveyor section adapted to support one of said separate work members,
    an actuator for selectively pivoting said turntable between a first position in which said first end of said first conveyor section is aligned with said work station and a second position in which said first end of said second conveyor section is aligned with said work station, and
    a pusher adapted to selectively engage one of said work members on said conveyor sections and move the engaged work member between an operable position in which said engaged work member is positioned at said work station and a standby position in which said engaged work member is positioned at said second end of its respective conveyor section wherein each work member comprises at least one fluid fitting and comprising means for selectively connecting and disconnecting a fluid line to said fluid fitting when said work member is positioned at said work station.

11. The invention as defined in claim 10 wherein said fluid line includes a coupling having a sleeve movable between an extended and a retracted position, wherein in said retracted position said coupling is disconnectable from said fluid fitting, and means for selectively moving said sleeve to said retracted position.

12. The invention as defined in claim 11 wherein said means for selectively moving said sleeve comprises a bracket, a grabber mounted to said bracket and positioned around said sleeve, and a plate actuator for moving said bracket.

13. An apparatus comprising:
    a frame, said frame having a work station,
    at least two separate work members,
    a turntable pivotally mounted to said frame at a position spaced from said work station,
    a first and second linear conveyor sections mounted to said turntable, each section having a first end and a second end, said conveyor sections extending in directions substantially perpendicular to each other, said second ends of said conveyor sections being adjacent each other, each conveyor section adapted to support one of said separate work members,
    an actuator for selectively pivoting said turntable between a first position in which said first end of said first conveyor section is aligned with said work station and a second position in which said first end of said second conveyor section is aligned with said work station, and a pusher adapted to selectively engage one of said work members on said conveyor sections and move the engaged work member between an operable position in which said engaged work member is positioned at said work station and a standby position in which said engaged work member is positioned at said second end of its respective conveyor section wherein said actuator comprises a piston and cylinder, one of said piston and cylinder being attached to said frame and the other of said piston and cylinder being attached to said turntable.

14. The invention as defined in claim 13 wherein said turntable is pivotally mounted to said frame about a substantially vertical axis.

* * * * *